(12) United States Patent
Guo

(10) Patent No.: US 12,301,439 B2
(45) Date of Patent: May 13, 2025

(54) METHODS AND APPARATUSES FOR COLLECTING CSQF SCHEDULE CYCLES APPLIED TO DETERMINISTIC NETWORK

(71) Applicant: NEW H3C TECHNOLOGIES CO., LTD., Zhejiang (CN)

(72) Inventor: Daorong Guo, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 0 days.

(21) Appl. No.: 18/567,229

(22) PCT Filed: Dec. 29, 2021

(86) PCT No.: PCT/CN2021/142638
§ 371 (c)(1),
(2) Date: Dec. 5, 2023

(87) PCT Pub. No.: WO2023/123105
PCT Pub. Date: Jul. 6, 2023

(65) Prior Publication Data
US 2024/0275708 A1 Aug. 15, 2024

(51) Int. Cl.
H04L 43/50 (2022.01)
H04L 43/067 (2022.01)
H04L 43/106 (2022.01)

(52) U.S. Cl.
CPC ............ H04L 43/50 (2013.01); H04L 43/067 (2013.01); H04L 43/106 (2013.01)

(58) Field of Classification Search
None
See application file for complete search history.

(56) References Cited

U.S. PATENT DOCUMENTS 7,339,948 B2 * 3/2008 Balasubramanian ... H04L 12/56
370/458
7,453,885 B2 * 11/2008 Rogers ..................... H04L 47/50
370/468

(Continued)

FOREIGN PATENT DOCUMENTS

CN 103716201 A 4/2014
CN 113382437 A 9/2021

(Continued)

OTHER PUBLICATIONS

European Patent Office, Extended European Search Report Issued in Application No. 21969473.4, Jun. 4, 2024, Germany, 11 pages.

(Continued)

Primary Examiner — Ranodhi Serrao
(74) Attorney, Agent, or Firm — GREENBLUM & BERNSTEIN, P.L.C.

(57) ABSTRACT

The present application provides methods and apparatuses for collecting CSQF schedule cycles applied to a deterministic network. For a head node on a transmission path, according to receiving time stamps of the head node receiving test packets and sending time stamps of the head node scheduling to send test packets, information on a CSQF schedule cycle of the head node is determined; for a non-head node, according to information on CSQF schedule cycles of other transmission nodes before the non-head node, test packets corresponding to the non-head node, when arriving at the other transmission nodes before the transmission node, are controlled to enter receiving queues RQs of the other transmission nodes, and according to receiving time stamps of the non-head node receiving test packets and sending time stamps of the non-head node scheduling to send test packets, information on a CSQF schedule cycle of the transmission node is determined.

19 Claims, 8 Drawing Sheets

(56) References Cited

U.S. PATENT DOCUMENTS

| | | | |
|---|---|---|---|
| 8,842,530 B2* | 9/2014 | Fourcand | H04J 3/0667 370/230 |
| 9,674,071 B2* | 6/2017 | Anand | H04L 47/22 |
| 2005/0073961 A1 | 4/2005 | Paik et al. | |
| 2005/0226195 A1* | 10/2005 | Paris | H04L 1/1838 370/254 |
| 2008/0130660 A1* | 6/2008 | Ros-Giralt | H04W 8/04 370/400 |
| 2008/0198833 A1* | 8/2008 | Tsai | H04W 72/12 370/345 |
| 2015/0103831 A1* | 4/2015 | Chandhoke | H04L 49/351 370/392 |
| 2015/0103849 A1* | 4/2015 | Chandhoke | H04J 3/0661 370/512 |
| 2016/0248656 A1* | 8/2016 | Anand | H04L 43/50 |
| 2021/0058322 A1 | 2/2021 | Geng et al. | |

FOREIGN PATENT DOCUMENTS

| | | |
|---|---|---|
| CN | 113644998 A | 11/2021 |
| EP | 4016942 A1 | 6/2022 |
| JP | 2009059182 A | 3/2009 |
| JP | 2023517574 A | 4/2023 |
| WO | 2015044931 A1 | 4/2015 |
| WO | 2021014180 A1 | 1/2021 |
| WO | 2021036915 A1 | 3/2021 |

OTHER PUBLICATIONS

Zeng Peng et al:"Time-slotted software-defined Industrial Ethernet for real-time Quality of Service in Industry 4.0", Future Generation Computer Systems, Elsevier Science Publishers.Amsterdam, NL,Apr. 9, 2019, 10 pages.

Schalk Kevin et al:"Microsecond-precision time stamping in a deterministic distributed sensor network utilizing openPowerlink", 2017 IEEE International Conference on Wireless for Space and Extreme Environments(WISEE), IEEE, Oct. 10, 2017, 5 pages.

ISA State Intellectual Property Office of the People's Republic of China, Written Opinion of the International Searching Authority Issued in Application No. PCT/CN2021/142638, Jul. 18, 2022, WIPO, 7 pages.

ISA State Intellectual Property Office of the People's Republic of China, International Search Report Issued in Application No. PCT/CN2021/142638, Jul. 18, 2022, WIPO, 4 pages.

M. Chen etc. "Segment Routing (SR) Based Bounded Latency draft-chen-detnet-sr-based-bounded-latency-01" "Network Working Group Internet-Draft Intended status: Informational Expires: Nov. 8, 2019", 24 pages.

Japanese Patent Office , Office Action Issued in Application No. 2023-574659, Nov. 12, 2024, 6 pages.

* cited by examiner

METHODS AND APPARATUSES FOR COLLECTING CSQF SCHEDULE CYCLES APPLIED TO DETERMINISTIC NETWORK

CROSS REFERENCE TO RELATED APPLICATIONS

The present application is a U.S. National Stage of International Application No. PCT/CN2021/142638 filed on Dec. 29, 2021, the contents of which are incorporated herein by reference in its entireties for all purposes.

TECHNICAL FIELD

The present application relates to network communication technology, and in particular, to methods and apparatuses for collecting Cycle Specified Queuing and Forwarding (CSQF) schedule cycles implemented based on segment routing and applied to a deterministic network.

BACKGROUND

A deterministic network (DetNet) can provide deterministic service functions for carried services in a network domain. These deterministic service functions may include a latency, a packet loss rate, etc.

In a DetNet, in order to realize deterministic transmission in a Wide Area Network, CSQF is put forward based on Cyclic Queuing and Forwarding (CQF). CSQF implements at least 3 queues (also referred to as Cycle Specified Queues (CSQs)). In each CSQF schedule cycle, only one queue is in a sending state and referred to as a Sending Queue (SQ), and at least one remaining queue is in a receiving state and referred to as a Receiving Queue (RQ).

In a DetNet, in order to realize deterministic transmission of packets, it is necessary to learn a CSQF schedule cycle of each transmission node, so that when packets arrive at each transmission node, queues that each transmission node is sending, namely, SQs, or queues that each transmission node is receiving, namely, RQs, can be timely learned. However, there is currently no way to timely acquire information on the CSQF schedule cycle of each transmission node, such as a start time of the CSQF schedule cycle.

SUMMARY

Embodiments of the present application provide methods for collecting CSQF schedule cycles applied to a DetNet, so as to collect CSQF schedule cycles of transmission nodes in the DetNet.

An embodiment of the present application provides a method for collecting CSQF schedule cycles applied to a DetNet. The method is performed by a Software-Defined Networking (SDN) controller, and includes:
for each transmission node on a transmission path in the DetNet,
if the transmission node is a head node on the transmission path, creating and sending test packets corresponding to the transmission node to the transmission node, acquiring receiving time stamps of the transmission node receiving the test packets and sending time stamps of the transmission node scheduling to send the test packets, and determining, according to the receiving time stamps and the sending time stamps, information on a CSQF schedule cycle of the transmission node;
if the transmission node is not a head node on the transmission path, creating test packets corresponding to the transmission node, controlling, according to information on CSQF schedule cycles of other transmission nodes before the transmission node on the transmission path, the test packets corresponding to the transmission node, when arriving at the other transmission nodes before the transmission node on the transmission path, to enter receiving queues RQs of the other transmission nodes, acquiring receiving time stamps of the transmission node receiving the test packets and sending time stamps of the transmission node scheduling to send the test packets, and determining, according to the receiving time stamps and the sending time stamps, information on a CSQF schedule cycle of the transmission node.

An embodiment of the present application provides a method for collecting CSQF schedule cycles applied to a DetNet. The method is performed by a head node on a transmission path in the DetNet, and includes:
when determining information on a CSQF schedule cycle of the head node, creating test packets corresponding to the head node, using time stamps of creating the test packets as receiving time stamps of the test packets, and determining, according to the receiving time stamps of the test packets and sending time stamps of scheduling to send the test packets, the information on the CSQF schedule cycle of the head node; and
when determining information on a CSQF schedule cycle of a non-head node on the transmission path, creating test packets corresponding to the non-head node, specifying, according to information on CSQF schedule cycles of other transmission nodes before the non-head node on the transmission path, queues that the test packets corresponding to the non-head node enter when arriving at the other transmission nodes, where the specified queues are queues corresponding to RQ identifiers in the information on the CSQF schedule cycles of the other transmission nodes, determining, according to a current time, sending start times of sending the test packets corresponding to the non-head node to specified queues of the head node, where the sending start times are for controlling test packets corresponding to a transmission node to enter the specified queues of the head node, and the specified queues are queues corresponding to RQ identifiers in the information on the CSQF schedule cycle of the head node, when the sending start times arrive, sending the test packets corresponding to the non-head node to the specified queues of the head node, acquiring receiving time stamps of the non-head node receiving the test packets and sending time stamps of the non-head nodes scheduling to send the test packets, and determining, according to the receiving time stamps and the sending time stamps, the information on the CSQF schedule cycle of the non-head node.

An embodiment of the present application provides an electronic device. The electronic device includes: a processor and a machine readable storage medium, where
the machine readable storage medium stores machine executable instructions executable by the processor; and
the processor is configured to execute the machine executable instructions to implement the steps in the methods disclosed above.

As can be known from the above technical solutions, in the embodiments of the present application, by, for each transmission node on a transmission path, creating test packets corresponding to the transmission node, and determining, according to receiving time stamps of the transmission node receiving the test packets and sending time stamps of the transmission node scheduling to send the test packets, information on a CSQF schedule cycle of the transmission node, collection of CSQF schedule cycles in a DetNet is realized.

Further, in the embodiments of the present application, if a tested transmission node is not a head node on the transmission path, by creating test packets corresponding to the transmission node, and controlling, according to information on CSQF schedule cycles of other transmission nodes before the transmission node on the transmission path, the test packets corresponding to the transmission node, when arriving at the other transmission nodes before the transmission node on the transmission path, to enter receiving queues RQs of the other transmission nodes, it is realized that test packets enter specified queues of the head node, which ensures collection accuracy of CSQF schedule cycles and facilitates forwarding of subsequent packets.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
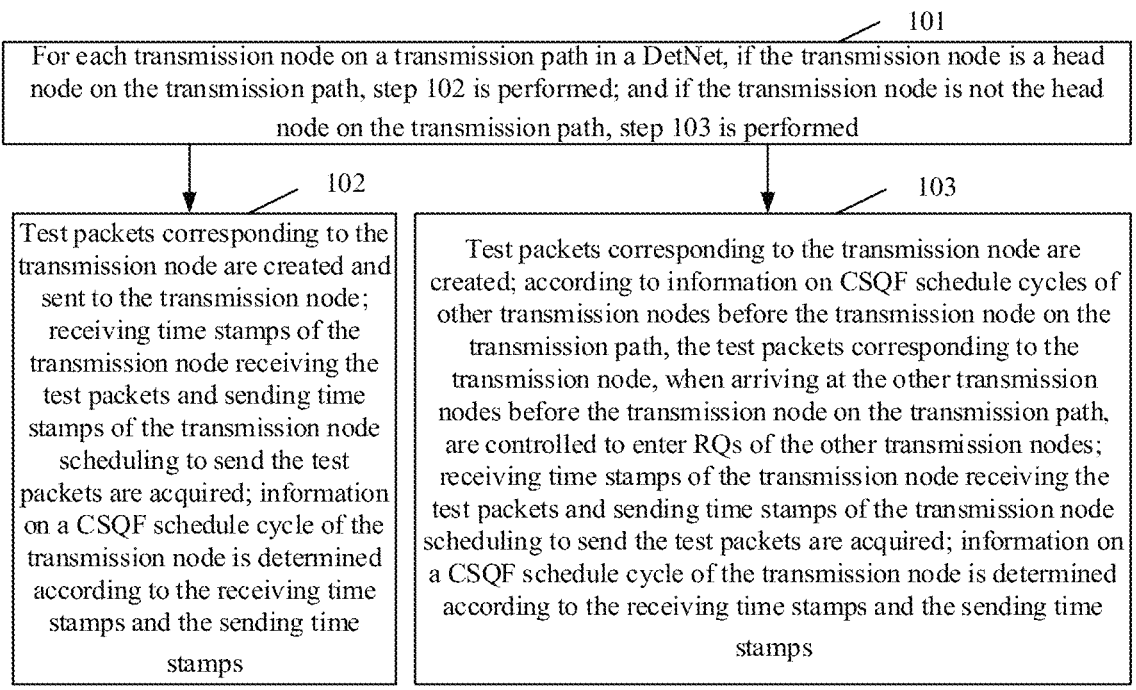
FIG. 1 is a flowchart illustrating a method according to an embodiment of the present application.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present application. Rather, they are merely examples of apparatuses and methods consistent with some aspects of the present application as detailed in the appended claims.

The terms used in the present application are for the purpose of describing particular examples only, and are not intended to limit the present application. Terms determined by "a", "the" and "said" in their singular forms in the present application and the appended claims are also intended to include plurality, unless clearly indicated otherwise in the context.

In order to enable those skilled in the art to better understand the technical solutions provided by the embodiments of the present application, and make the objects, features and advantages of the embodiments of the present application more apparent, the technical solutions in the embodiments of the present application will be described in further detail below with reference to the accompanying drawings.

FIG. 1 is a flowchart illustrating a method according to an embodiment of the present application. The method is applied to an SDN controller.

As shown in FIG. 1, the method may include the following steps.

At step 101, for each transmission node on a transmission path in a DetNet, if the transmission node is a head node on the transmission path, step 102 is performed; and if the transmission node is not the head node on the transmission path, step 103 is performed.

Figure 2:
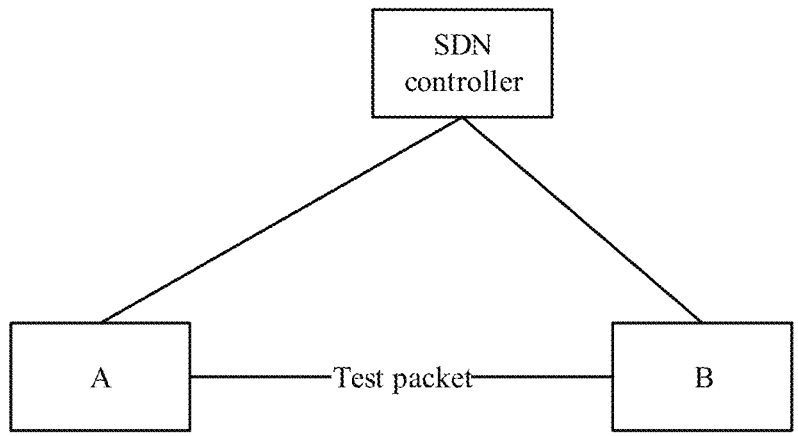
FIG. 2 is a schematic diagram illustrating a network according to an embodiment of the present application.

In this embodiment, the transmission path can be arbitrarily disposed, which is not specifically limited to this embodiment. FIG. 2 shows a network structure to which the method in FIG. 1 is applied by taking as an example that there are two transmission nodes A and B on a transmission path. Based on the transmission path A->B shown in FIG. 2, for the transmission node A, step 102 is performed, and for the transmission node B, step 103 is performed. It should be noted that the transmission path A->B shown in FIG. 2 is an example just for convenience of understanding, but not for limitation.

At step 102, test packets corresponding to the transmission node are created and sent to the transmission node; receiving time stamps of the transmission node receiving the test packets and sending time stamps of the transmission node scheduling to send the test packets are acquired; information on a CSQF schedule cycle of the transmission node is determined according to the receiving time stamps and the sending time stamps.

In this embodiment, a total number N of the created test packets corresponding to the transmission node is a total number of queues that the transmission node has and are implemented by CSQF.

In addition, in this embodiment, N test packets corresponding to the transmission node can be configured to respectively enter N queues of the transmission node, so as to ensure that different test packets enter different queues. In other words, in this embodiment, each test packet can carry an identifier of a queue which the test packet is configured to enter. For example, a test packet with sequence number 0 enters a queue with sequence number 0, and a test packet with sequence number 1 enters a queue with sequence number 1.

Based on this, the transmission node, after receiving a test packet, will store the test packet in a corresponding queue based on its carried queue identifier, finally realizing that N test packets respectively enter N queues of the transmission node.

It should be noted that, in this embodiment, the transmission node, when receiving test packets, will record time stamps of receiving the test packets (referred to as receiving time stamps). Afterwards, the receiving time stamps will be reported to the SDN controller. In this embodiment, receiving time stamps of different test packets may be same or different, which is not specifically limited to this embodiment.

In addition, in this embodiment, the transmission node will schedule queues in turn according to the CSQF schedule cycle to send test packets in the queues. Based on this, the transmission node, when sending the test packets, will record time stamps of sending the test packets (referred to as sending time stamps). Afterwards, the sending time stamps will be reported to the SDN controller. In this embodiment, sending time stamps of different test packets may be the same or different, which is not specifically limited to this embodiment.

In addition, in this embodiment, the sending time stamps and the receiving time stamps can be reported together or separately to the SDN controller, which is not specifically limited to this embodiment.

The SDN controller, after acquiring the receiving time stamps of the transmission node receiving the test packets and the sending time stamps of the transmission node scheduling to send the test packets, as described in step 102, will determine the information on the CSQF schedule cycle of the transmission node according to the receiving time stamps and the sending time stamps. How to determine the information on the CSQF schedule cycle of the transmission node according to the receiving time stamps and the sending time stamps will be exemplified below, and will not be repeated here.

At step 103, test packets corresponding to the transmission node are created; according to information on CSQF schedule cycles of other transmission nodes before the transmission node on the transmission path, the test packets corresponding to the transmission node, when arriving at the other transmission nodes before the transmission node on the transmission path, are controlled to enter RQs of the other transmission nodes; receiving time stamps of the transmission node receiving the test packets and sending time stamps of the transmission node scheduling to send the test packets are acquired; information on a CSQF schedule cycle of the transmission node is determined according to the receiving time stamps and the sending time stamps.

In this embodiment, according to the information on the CSQF schedule cycles of the other transmission nodes before the transmission node on the transmission path, the test packets corresponding to the transmission node, when arriving at the other transmission nodes before the transmission node on the transmission path, can be configured to enter the RQs of the other transmission nodes, finally realizing that the test packets corresponding to the transmission node, when arriving at the other transmission nodes before the transmission node on the transmission path, enter the RQs of the other transmission nodes, which will be described in detail below, and will not be repeated here.

How to determine the information on the CSQF schedule cycle of the transmission node according to the receiving time stamps and the sending time stamps will be described in detail below, and will not be repeated here.

So far, processes shown in FIG. 1 are completed. Information on a CSQF schedule cycle of each transmission node on an entire transmission path is collected through the processes shown in FIG. 1.

How to determine the information on the CSQF schedule cycle of the transmission node according to the receiving time stamps and the sending time stamps in aforementioned step 102 or 103 will be described below.

In some examples, for convenience of understanding how to determine the information on the CSQF schedule cycle of the transmission node according to the receiving time stamps and the sending time stamps, a principle involved in the information on the CSQF schedule cycle will be first described here.

Taking a network shown in FIG. 2 as an example, it is assumed that each transmission node shown in FIG. 2 establishes three queues based on CSQF, and the three queues are denoted as Q1, Q2 and Q3 respectively. Symbols that may be used will be explained below:

1) i, j and k are sequence numbers of three test packets respectively. In some examples, i, j and k are consecutive. For example, i+1=j and j+1=k. A test packet with sequence number i is denoted as packet i, a test packet with sequence number j is denoted as packet j, and a test packet with sequence number k is denoted as packet k.

2) t1A[i] represents a time stamp of packet i arriving at the transmission node (that is, a receiving time stamp), txA[i] represents a time stamp of packet i being scheduled to be sent (that is, a scheduling time stamp), and t2A[i] represents a time stamp of packet i being sent (that is, a sending time stamp); t1A[j] represents a time stamp of packet j arriving at the transmission node (that is, a receiving time stamp), txA[j] represents a time stamp of packet j being scheduled to be sent (that is, a scheduling time stamp), and t2A[j] represents a time stamp of packet j being sent (that is, a sending time stamp); t1A[k] represents a time stamp of packet k arriving at the transmission node (that is, a receiving time stamp), txA[k] represents a time stamp of packet k being scheduled to be sent (that is, a scheduling time stamp), and t2A[k] represents a time stamp of packet k being sent (that is, a sending time stamp).

Figure 3A:
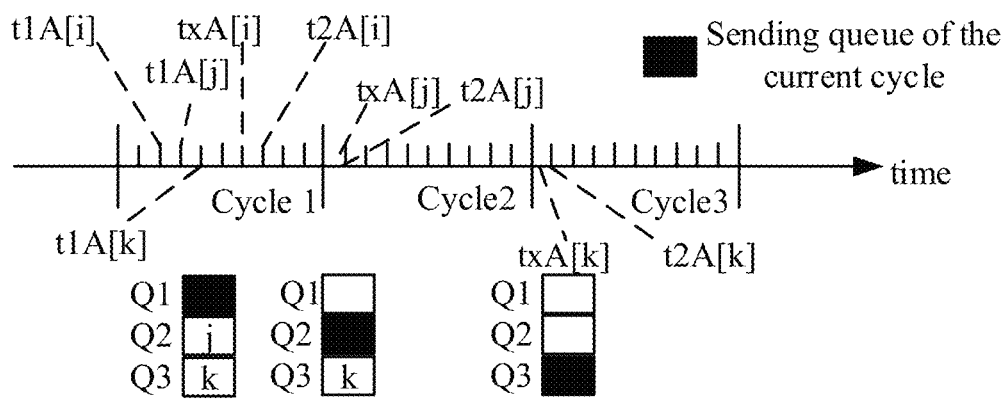
FIGS. 3a to 3c are schematic diagrams illustrating packet scheduling according to an embodiment of the present application.
Figure 3B:
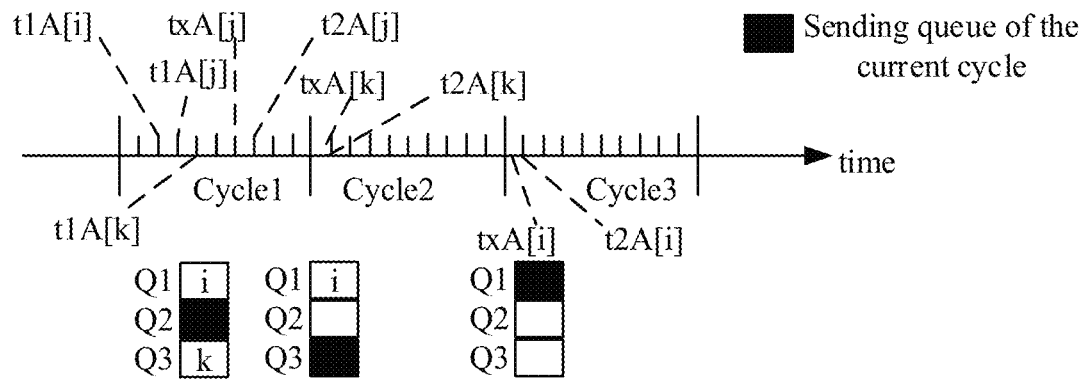
Figure 3C:
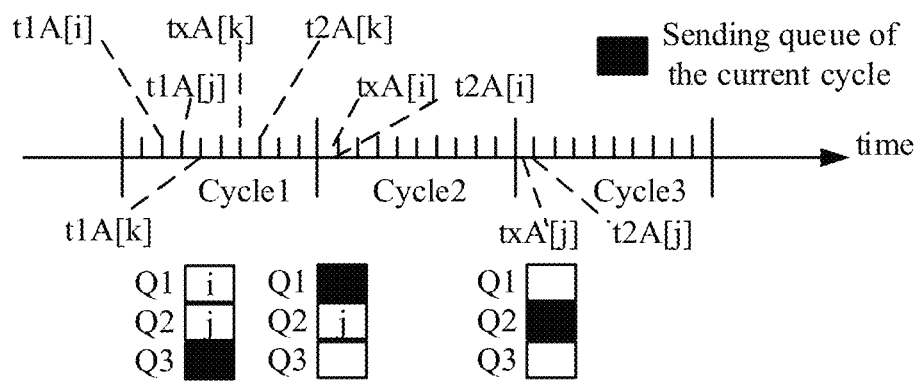

Taking the transmission path A->B shown in FIG. 2 as an example, FIGS. 3a to 3c show that all of packet i, packet j and packet k arrive at the transmission node A in the same CSQF schedule cycle of the transmission node A (referred to as Cycle 1), and their arriving times are not out of a boundary of Cycle 1.

Taking FIG. 3a as an example, it is assumed that the transmission node A is scheduling Q1 in Cycle 1. If packet i is configured to enter Q1, when the packet i arrives at the transmission node A, since Q1 is being scheduled, the packet i will be scheduled to be sent soon in Cycle 1. In an ideal situation, both txA[i] and t2A[i] are completed in Cycle 1.

In FIG. 3a, packet j and packet k received by the transmission node A in Cycle 1 will enter Q2 and Q3 respectively. At the start of Cycle 2, Q2 will be scheduled, and packet j will be scheduled to be sent soon at the start of Cycle 2.

Accordingly, txA[j] and t2A[j] are close to a start time (or timing) of Cycle 2. Similarly, at the start of Cycle 3, Q3 will be scheduled, and packet k will be scheduled to be sent soon at the start of Cycle 3. Also, txA[k] and t2A[k] are close to a start time of Cycle 3. FIGS. 3b and 3c are similar to FIG. 3a. Their difference lies mainly in that when test packets arrive, queues being scheduled are different.

From FIGS. 3a to 3c, the following conclusions can be drawn.

1) For any test packet, a scheduling time stamp (tA) of the test packet, such as txA[i], txA[j], txA[k] or the like, cannot be directly acquired, but since an interval between txA and a sending time stamp t2A of the test packet is very small and relatively deterministic, the sending time stamp t2A of the test packet can be used approximately to replace the scheduling time stamp txA.

2) For an earliest received test packet (that is, a test packet with an earliest receiving time stamp), if receiving and sending of the test packet are completed in a same CSQF schedule cycle, a time determined by going backward by 2 CSQF schedule cycles from a latest sending time stamp (a latest time stamp in sending time stamps of all test packets), can approximate a start time of a CSQF schedule cycle where the earliest receiving time stamp (an earliest time stamp in receiving time stamps of all test packets) is located. For example, in FIG. 3a, the latest sending time stamp is t2A[k], and the earliest receiving time stamp is t1A[i]. According to the above conclusion, a start time of a CSQF schedule cycle where the earliest receiving time stamp t1A[i] is located is approximately t2A[k]−2T. Correspondingly, an offset of a CSQF schedule cycle when packet i is received can be calculated to be approximately t2A[i]−(t2A[k]−2T). T is a duration (or time length) of a CSQF schedule cycle, for example, 10 us.

Figure 4A:
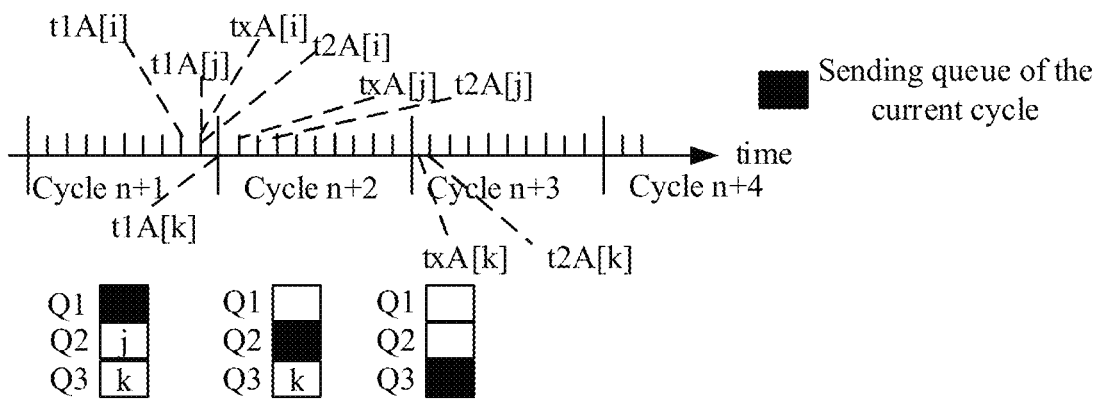
FIGS. 4a to 4b are schematic diagrams illustrating another packet scheduling according to an embodiment of the present application.
Figure 4B:
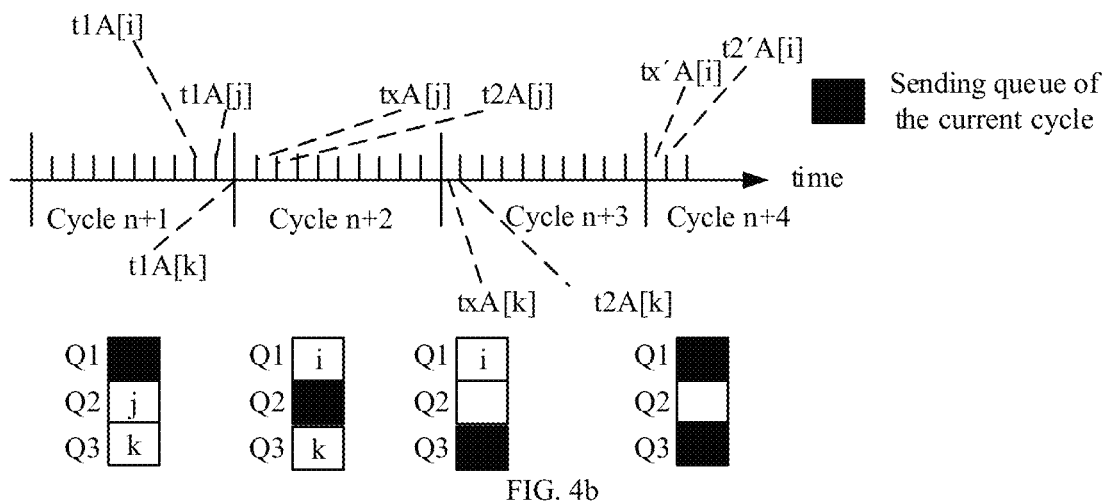

It should be noted that FIGS. 3a to 3c illustrate applications in an ideal situation (that is, the time when a transmission node receives a test packet does not exceed a boundary of a CSQF schedule cycle). However, in some special situations, there may exist the situation that the time when the transmission node receives the test packet exceeds the boundary of the CSQF schedule cycle, for example, a situation shown in FIGS. 4a-4b. Taking FIG. 4a as an example, the transmission node A receives packet i near the end of Cycle n+1, and packet i may be scheduled to be sent in Cycle n+1, or may be scheduled to be sent in Cycle n+4 as shown in FIG. 4b due to processing latency and slight jitter. However, whether in the ideal situation shown in FIGS. 3a to 3c or the special situation shown in FIGS. 4a to 4b, a latest sending time stamp (a latest time stamp in sending time stamps of all test packets) can approximate a start time of a CSQF schedule cycle. Except that it may be not clear which CSQF schedule cycle this CSQF schedule cycle specifically refers to, it is certain that the latest sending time stamp approximates the start time of a CSQF schedule cycle.

Based on the above conclusion that a sending time stamp of a latest sent test packet is approximately a start time of a CSQF schedule cycle, how to determine the information on the CSQF schedule cycle of the transmission node according to the receiving time stamps and the sending time stamps will be described below.

Figure 5:
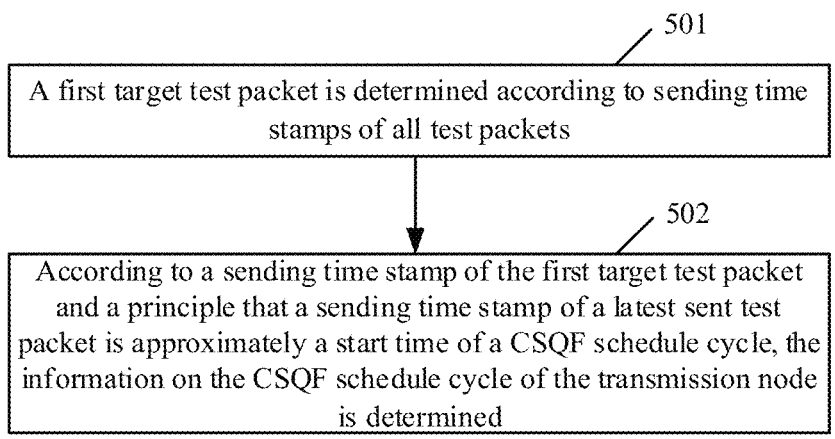
FIG. 5 is a flowchart of determining information on a CSQF schedule cycle according to an embodiment of the present application.

FIG. 5 is a flowchart of determining information on a CSQF schedule cycle of a transmission node according to receiving time stamps and sending time stamps according to an embodiment of the present application. As shown in FIG. 5, processes may include the following steps.

At step 501, a first target test packet is determined according to sending time stamps of all test packets.

Optionally, in this embodiment, a sending time stamp of the first target test packet is later than sending time stamps of other test packets. That is, the first target test packet is a latest sent test packet in all test packets.

Optionally, in this embodiment, a time difference between a sending time stamp and a receiving time stamp of the first target test packet is larger than the time difference between the sending time stamp and the receiving time stamp of any one of the other test packets. In other words, the first target test packet is a test packet with a largest time difference between the sending time stamp and the receiving time stamp of all test packets.

At step 502, according to a sending time stamp of the first target test packet and a principle that a sending time stamp of a latest sent test packet is approximately a start time of a CSQF schedule cycle, the information on the CSQF schedule cycle of the transmission node is determined.

Optionally, in this embodiment, step 502 can be implemented through the following steps.

At step a1, a second target test packet is determined according to receiving time stamps of all the test packets.

Optionally, in this embodiment, a receiving time stamp of the second target test packet is earlier than receiving time stamps of other test packets. That is, the second target test packet is an earliest received test packet.

At step a2, a loop variable value Loop is determined, where the Loop satisfies the following formula: t2A[p]>t1A[q]+Loop*T.

The t2A[p] represents the sending time stamp of the first target test packet, t1A[q] represents the receiving time stamp of the second target test packet, and T is a duration of a CSQF schedule cycle, for example, 10 us. Here, the determined Loop may be a smallest value of the loop variable satisfying the formula.

At step a3, the information on the CSQF schedule cycle is determined according to the sending time stamp of the first target test packet, a receiving time stamp of the second target test packet, and the Loop.

Optionally, in this embodiment, the information on the CSQF schedule cycle may include at least the followings.

1) A Cycle Start Time

In this embodiment, the cycle start time refers to a start time of a target CSQF schedule cycle where the transmission node is located when the second target test packet is received.

As described above, the sending time stamp of the latest sent test packet is approximately the start time of the CSQF schedule cycle, that is, t2A[p] is a start time of a CSQF schedule cycle. Based on this, the start time of the cycle can be: t2A[p]−Loop*T.

2) An SQ Identifier

In this embodiment, the SQ identifier is for indicating a queue identifier of a queue being scheduled to be sent in the target CSQF schedule cycle.

Optionally, in this embodiment, the SQ identifier is expressed by (p−1+N−Loop) mod N+1, where p refers to a sequence number of the second target test packet.

3) An RQ Identifier

In this embodiment, the RQ identifier is for indicating a queue identifier of a queue being scheduled to be sent in a next CSQF schedule cycle of the target CSQF schedule cycle.

Optionally, in this embodiment, the queue corresponding to the RQ identifier is in a receiving state in the target CSQF schedule cycle. If the transmission node schedules queues in turn, the queue corresponding to the RQ identifier can be a next queue of the queue corresponding to the SQ identifier.

Optionally, in this embodiment, the RQ identifier is expressed by (p+N−Loop) mod N+1.

Of course, in an embodiment, the information on the CSQF schedule cycle may further include: a packet identifier of the second target test packet, such as sequence number q, a receiving time stamp t1A[q] of the second target test packet, a packet identifier of the first target test packet, such as sequence number p, a sending time stamp t2A[p] of the first target test packet, and the like, which is not specifically limited in this embodiment.

So far, processes shown in FIG. 5 are completed.

The information on the CSQF schedule cycle of the transmission node is determined according to the receiving time stamps and the sending time stamps through the processes shown in FIG. 5.

In this embodiment, for the head node on the transmission path, such as the transmission node A shown in FIG. 2, information on a CSQF schedule cycle of the head node, such as the transmission node A, is finally acquired according to the method shown in FIG. 5. For a certain transmission node after the head node on the transmission path, according to information on CSQF schedule cycles of other transmission nodes before the certain transmission node on the transmission path, test packets corresponding to the certain transmission node, when arriving at the other transmission nodes before the certain transmission node on the transmission path, need to be controlled to enter RQs of the other transmission nodes, the implementation of which will be specifically described below.

Figure 6:
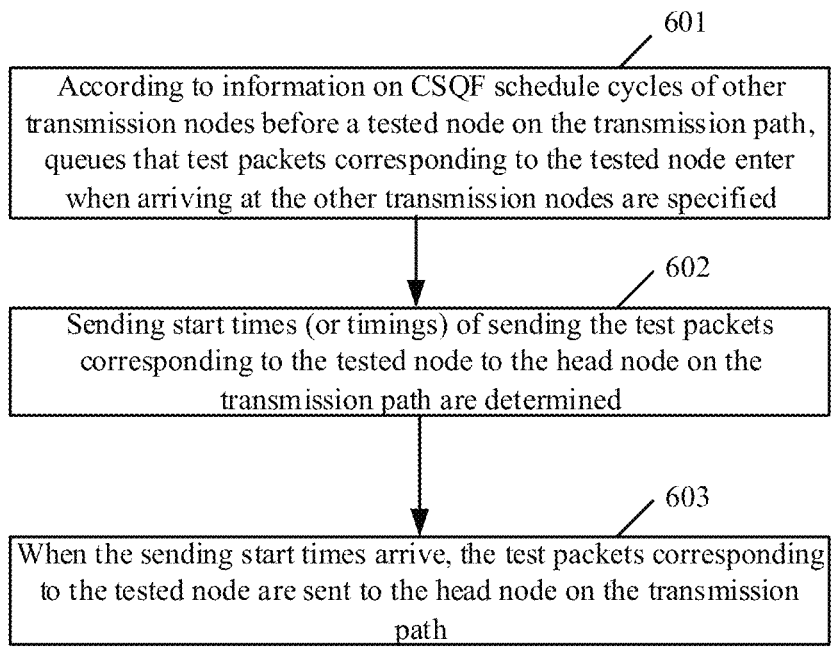
FIG. 6 is a flowchart of controlling a test packet to enter a specified queue according to an embodiment of the present application.

FIG. 6 is a flowchart of controlling a test packet to enter a specified queue according to an embodiment of the present application. In processes shown in FIG. 6, for convenience of identifying, when information on a CSQF schedule cycle of a transmission node after the head node on the transmission path is determined, the transmission node can be referred to as a tested node.

As shown in FIG. 6, the processes may include the following steps.

At step 601, according to information on CSQF schedule cycles of other transmission nodes before a tested node on the transmission path, queues that test packets corresponding to the tested node enter when arriving at the other transmission nodes are specified.

In this embodiment, when the information on the CSQF schedule cycle of the tested node is determined, the SDN controller will create corresponding test packets for the non-head node.

Based on the information on the CSQF schedule cycles, in this embodiment, the test packets corresponding to the tested node can be configured to respectively enter queues corresponding to RQ identifiers in the information on the CSQF schedule cycles of the other transmission nodes.

Taking a transmission path A->B->C->D as an example, if the tested node is B, test packets corresponding to node B are configured to enter queues corresponding to RQ identifiers in information on a CSQF schedule cycle of node A, for example, queue 0.

For another example, if the tested node is C, test packets corresponding to node C are configured to enter queues corresponding to RQ identifiers in information on a CSQF schedule cycle of node A, for example, queue 0, and queues corresponding to RQ identifiers in information on a CSQF schedule cycle of node B, for example, queue 1.

For another example, if the tested node is D, test packets corresponding to node D are configured to enter queues corresponding to RQ identifiers in information on a CSQF schedule cycle of node A, for example, queue 0, queues corresponding to RQ identifiers in information on a CSQF schedule cycle of node B, for example, queue 1, and queues corresponding to RQ identifiers in information on a CSQF schedule cycle of node C, for example, queue 2.

At step 602, sending start times (or timings) of sending the test packets corresponding to the tested node to the head node on the transmission path are determined.

In step 602, in order to ensure that the test packets corresponding to the tested node, when arriving at the other transmission nodes, enter the specified queues in the other transmission nodes, the sending start times of sending the test packets corresponding to the tested node to the head node on the transmission path needs to be determined.

In this embodiment, the SDN controller, when determining the information on the CSQF schedule cycle of the head node, will record sending times (referred to as initial sending times/timings) of sending test packets to the head node. Initial sending times of different test packets may be same or different, which is not specifically limited to this embodiment. Based on this, in this embodiment, from the initial sending times of sending the test packets to the head node when the information on the CSQF schedule cycle of the head node is determined, the following initial sending times (referred to as T-starts) can be acquired: initial sending times of the test packets configured to enter RQs of the head node. Based on the T-starts, the sending start times of sending the test packets corresponding to the non-head node to the head node in step 603 can be determined. For example, a future time point time1 is set. time1=N*T+time−[(time−T_start) mod(N*T)], where time represents a current time point. The current time point is read to determine whether the current time point is less than time1. If the current time point is less than time1, return to the step of reading the current time point; otherwise, the current time point is determined as the sending start time of sending the test packet corresponding to the non-head node to the head node.

At step 603, when the sending start times arrive, the test packets corresponding to the tested node are sent to the head node on the transmission path.

By sending the test packets corresponding to the tested node to the head node on the transmission path at the determined sending start times, the test packets corresponding to the tested node, when arriving at the other transmission nodes before the tested node on the transmission path, will be controlled to enter the specified RQs of the other transmission nodes.

It should be noted that, in this embodiment, before the processes shown in FIG. 6 are executed, time synchronization may be first performed among the SDN controller and each transmission node on the transmission path.

For making the processes shown in FIG. 6 clearer, embodiment description will be given below.

Figure 7:
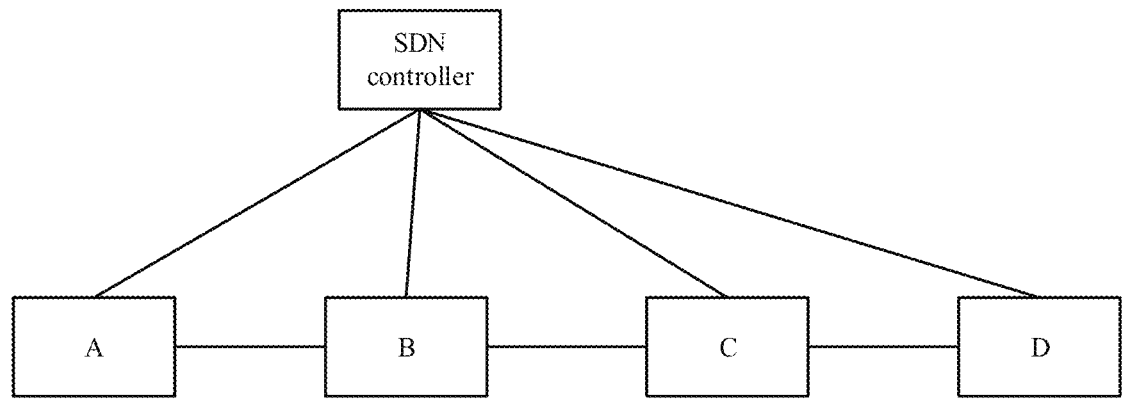
FIG. 7 is a schematic diagram illustrating a network according to an embodiment of the present application.

Taking a network shown in FIG. 7 as an example, it is assumed that the transmission path is A->B->C->D->E. Collected node set Pre-Path and to-be-collected node set Next-Path are preset. Initially, Pre-Path is empty, and Next-Path includes five nodes A, B, C, D and E arranged in a path order.

Next-Path is traversed according to the path order, and the node being traversed is set as a current node. It is identified whether the current node is a head node on the transmission path.

Figure 8:
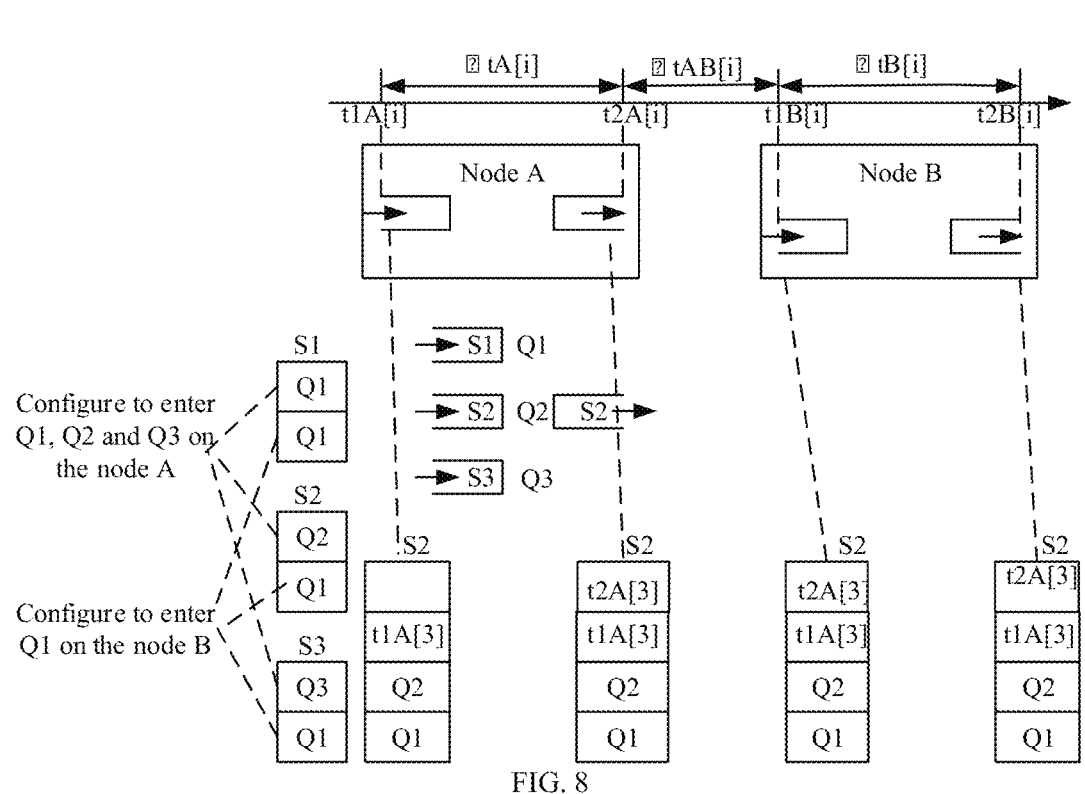
FIG. 8 is a schematic diagram of determining information on a CSQF schedule cycle according to an embodiment of the present application.

As an example, when it is identified that the current node is a head node on the transmission path, information on a CSQF schedule cycle of the head node is determined according to the processes shown in FIG. 5. It is assumed that the current node is node A, that is, the current node is the head node on the transmission path. FIG. 8 shows determination of information on a CSQF schedule cycle of node A by taking creation of three test packets for node A as an example.

Then, an identifier of the current node, that is, node A, and the information on the CSQF schedule cycle of the current node are recorded in Pre-Path. It is identified whether there still exists a next node of the current node on the transmission path. If there still exists the next node of the current node on the transmission path, return to the step of traversing Next-Path in the path order.

As another example, when it is identified that the current node is not a head node on the transmission path, taking the current node being node B as an example, according to the information on the CSQF schedule cycle of head node A on the transmission path, test packets corresponding to node B, when arriving at head node A, are configured to enter specified RQs of the head node (the specified RQs here refer to queues corresponding to RQ identifiers in the information on the CSQF schedule cycle of head node A on the transmission path).

Then, according to the method in step 602 shown in FIG. 6, sending start times of sending the test packets corresponding to node B to head node A are determined, and when the sending start times arrive, the test packets corresponding to node B start to be sent. Finally, the test packets corresponding to node B, after arriving at head node A, will enter specified RQs of the head node as configured (the specified RQs here refer to queues corresponding to RQ identifiers in the information on the CSQF schedule cycle of head node A on the transmission path).

Figure 9:
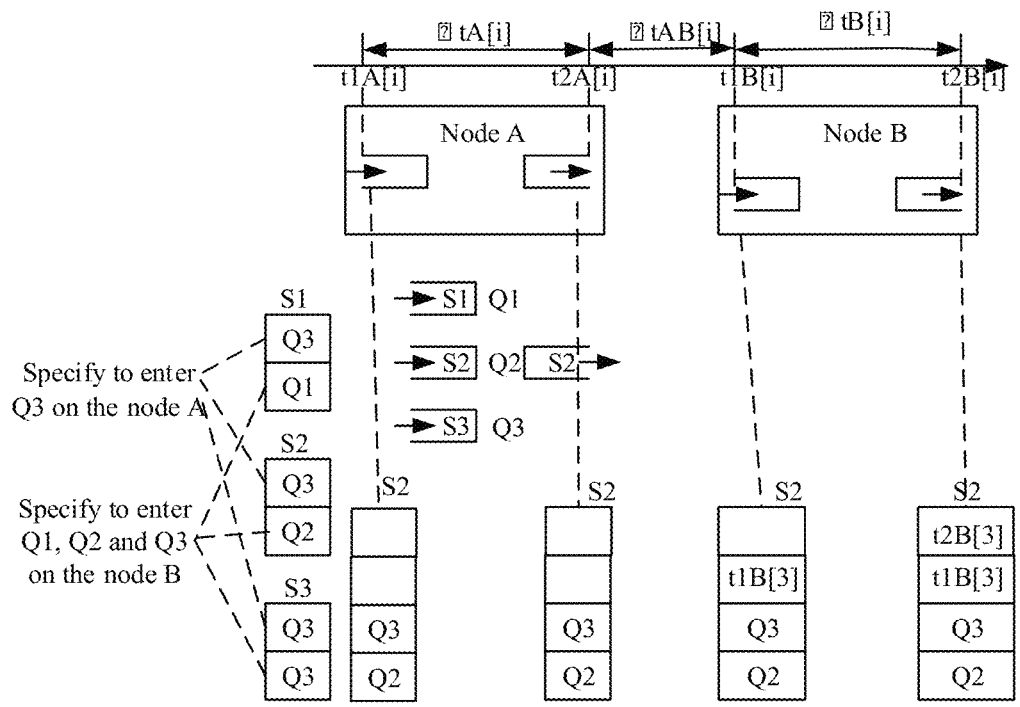
FIG. 9 is another schematic diagram of determining information on a CSQF schedule cycle according to an embodiment of the present application.

Then, when CSQF schedule cycles for scheduling specified RQs arrive, head node A schedules to send test packets in the specified RQs. Node B will finally receive the test packets sent from head node A and the received test packets will respectively enter different queues of node B. Afterwards, node B will schedule to send the test packets in each queue according to a CSQF schedule cycle. According to the processes shown in FIG. 5, information on the CSQF schedule cycle of node B will be finally determined. FIG. 9 shows how to determine the information on the CSQF schedule cycle of node B based on three test packets created for node B by taking a specified RQ being queue 3 (Q3) as an example.

It should be noted that, in this embodiment, RQ identifiers in the information on the CSQF schedule cycle of node B are determined when queues corresponding to RQ identifiers in the information on the CSQF schedule cycle of node A are scheduled to be sent. In other words, if, when the queues corresponding to the RQ identifiers in the information on the CSQF schedule cycle of node A are scheduled to be sent, packets in the queues are scheduled to be sent to queues corresponding to the RQ identifiers in the information on the CSQF schedule cycle of node B, it can be ensured that the packets will be sent preferentially by node B. Based on this, when information on CSQF schedule cycles of nodes after node B (taking node C as an example) is determined below, test packets created for node C can be configured to enter the queues corresponding to the RQ identifiers in the information on the CSQF schedule cycle of node A, and the queues corresponding to the RQ identifiers in the information on the CSQF schedule cycle of node B.

Then, an identifier of the current node, that is, node B, and the information on the CSQF schedule cycle of the current node are recorded in Pre-Path. It is identified whether there still exists a next node of the current node on the transmission path. If there still exists the next node of the current node on the transmission path, return to the step of traversing Next-Path in the path order.

For another example, when it is identified that the current node is not a head node on the transmission path, taking the current node being node C as an example, according to the information on the CSQF schedule cycle of head node A and the information on the CSQF schedule cycle of node B on the transmission path, test packets corresponding to node C, when arriving at head node A, are configured to enter specified RQs of the head node (the specified RQs here refer to queues corresponding to RQ identifiers in the information on the CSQF schedule cycle of head node A on the transmission path), and when arriving at node B, are configured to enter specified RQs of node B (the specified RQs here refer to queues corresponding to RQ identifiers in the information on the CSQF schedule cycle of node B on the transmission path)

Then, according to the method in step 602 shown in FIG. 6, sending start times of sending the test packets corresponding to node C to head node A are determined, and when the sending start times arrive, the test packets corresponding to node C start to be sent. Finally, the test packets corresponding to node C, after arriving at head node A, will enter specified RQs of the head node as configured (the specified RQs here refer to queues corresponding to RQ identifiers in the information on the CSQF schedule cycle of head node A on the transmission path). Then, when CSQF schedule cycles for scheduling specified RQs arrive, head node A schedules to send test packets in the specified RQs. Finally, the test packets corresponding to node C will arrive at node B. After node B receives the test packets corresponding to node C, the test packets will enter specified RQs of node B as configured (the specified RQs here refer to queues corresponding to RQ identifiers in the information on the CSQF schedule cycle of node B on the transmission path).

Then, when CSQF schedule cycles for scheduling specified RQs arrive, node B schedules to send test packets in the specified RQs. Finally, the test packets corresponding to node C will arrive at node C and respectively enter different queues of node C. Afterwards, node C will schedule to send the test packets in each queue according to a CSQF schedule cycle. According to the processes shown in FIG. 5, information on the CSQF schedule cycle of node C will be finally determined.

It should be noted that, in this embodiment, RQ identifiers in the information on the CSQF schedule cycle of node C are determined when queues corresponding to RQ identifiers in the information on the CSQF schedule cycle of node B are scheduled to be sent, and RQ identifiers in the information on the CSQF schedule cycle of node B are determined when queues corresponding to RQ identifiers in the information on the CSQF schedule cycle of node A are scheduled to be sent. In other words, in order to ensure that packets are sent preferentially, when information on CSQF schedule cycles of nodes after node C (taking node D as an example) is determined below, test packets created for node D can be configured to enter the queues corresponding to the RQ identifiers in the information on the CSQF schedule cycle of node A, the queues corresponding to the RQ identifiers in the information on the CSQF schedule cycle of node B, and the queues corresponding to the RQ identifiers in the information on the CSQF schedule cycle of node C.

Then, an identifier of the current node, that is, node C, and the information on the CSQF schedule cycle of the current node are recorded in Pre-Path. It is identified whether there still exists a next node of the current node on the transmission path. If there still exists the next node of the current node on the transmission path, return to the step of traversing Next-Path in the path order. Of course, if it is identified that there does not exist the next node of the current node on the transmission path, current processes end.

When the current node is node D, processes of node D are similar to that of node B and node C, which will not be repeated here.

Finally, through the above description, determination of information on a CSQF schedule cycle of each transmission node on an entire transmission path can be completed.

It should be noted that, in this embodiment, as an example, time adjustment can be performed on at least one transmission node on the transmission path in advance, so as to control time synchronization among all transmission nodes on the transmission path, which is convenient to acquire information on a CSQF schedule cycle of each transmission node based on a same time base.

Figure 10:
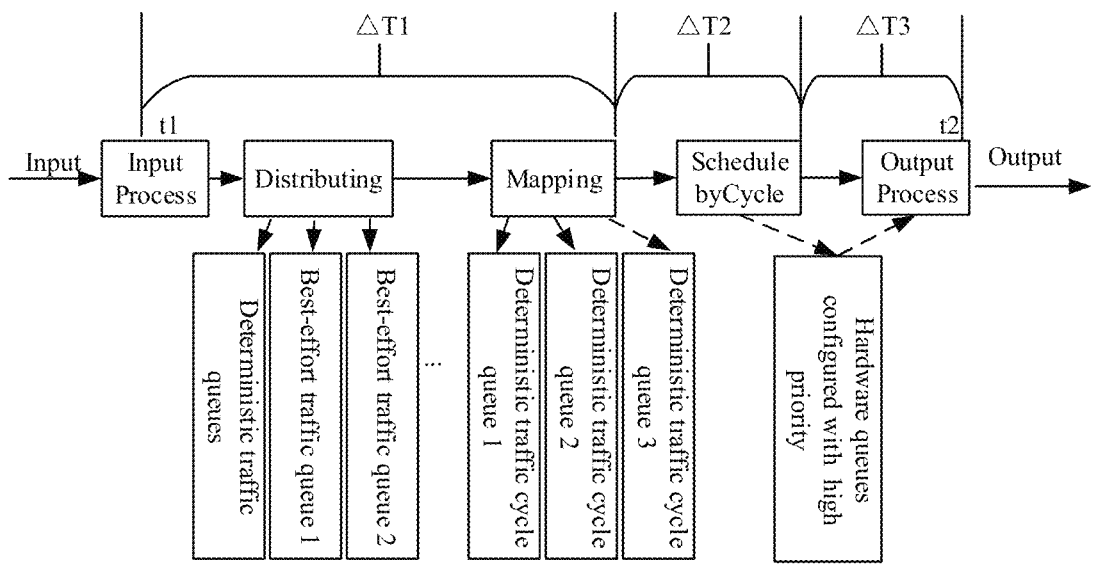
FIG. 10 is a schematic diagram illustrating internal processes of transmission nodes in a DetNet according to an embodiment of the present application.

As shown in FIG. 10, in a DetNet, each transmission node involves the following 5 links:
1) Input Process, for implementing anchoring of input time stamps;
2) Distributing, for distributing packets, such as distributing packets belonging to best-effort flows to best-effort traffic queues, and distributing packets belonging to deterministic flows to deterministic traffic queues;
3) Mapping, for mapping packets to queues to be scheduled to be sent;
4) Schedule by Cycle, for scheduling packets in queues according to a CSQF schedule cycle and sending the packets to hardware queues configured with a reserved highest priority;
5) Output Process, for sending packets and marking output time stamps by configuring the hardware queues with a reserved highest priority as hardware queues for sending deterministic flows.

Within any transmission node, time elements involved in a packet include:
1) a packet receiving time stamp t1 can be acquired in the Input Process;
2) a time overhead for the Distributing and the Mapping is $\Delta T1$;
3) through a schedule latency $\Delta T2$ and a time latency $\Delta T3$ for marking a sending time stamp, the sending time stamp of sending the packet is finally t2.

In the above processes, t1 and t2 are clocks in a same clock domain of a same transmission node, and can be accurately acquired.

According to the above analysis, a relationship between t1 and t2 is expressed by formula 1:

$$t2 = t1 + \Delta T1 + \Delta T2 + \Delta T3 \qquad (1)$$

Let: $\Delta t = \Delta T1 + \Delta T2 + \Delta T3$.

Formula 1 can be simplified to:

$$t2 = t1 + \Delta t \qquad (2)$$

Figure 11:
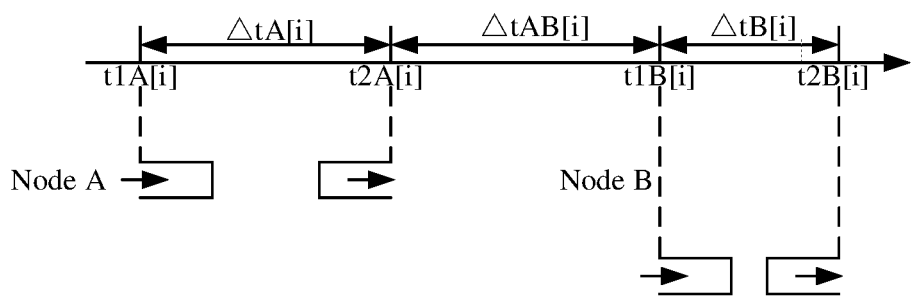
FIG. 11 is a schematic diagram illustrating packet processes between different transmission nodes according to an embodiment of the present application.

Based on formula 2, as shown in FIG. 11, comprehensive latencies of transmission node A and transmission node B are:

$$t2A[i] = t1A[i] + \Delta tA[i]; \ t2B[i] = t1B[i] + \Delta tB[i],$$

where i represents an $i^{th}$ test packet.

Figure 12:
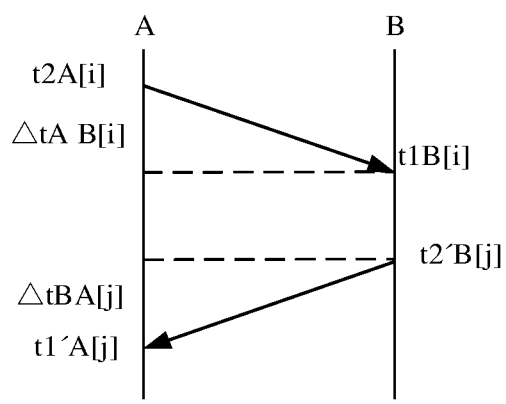
FIG. 12 is a schematic diagram illustrating a PTP calculation method according to an embodiment of the present application.

A latency between transmission nodes A and B, that is, $\Delta tAB[i]$, crosses transmission nodes A and B, but because time bases between transmission nodes A and B are different, $\Delta tAB[i]$ cannot be acquired by subtracting a sending time stamp t2A[i] of transmission node A directly from a receiving time stamp t1B[i] of transmission node B, thus requiring a calculation method which is similar to a PTP calculation method shown in FIG. 12.

In FIG. 12, a packet indicated by j is different from that indicated by i, $\Delta tAB[i]$ represents a latency from a sending time stamp of transmission node A to a receiving time stamp of transmission node B, and $\Delta tBA[i]$ represents a latency from a sending time stamp of transmission node B to a receiving time stamp of transmission node A.

Since a round-trip route is symmetrical, and latencies in this part are basically determined by physical characteristics, compared with queuing latencies, latencies of different packets do not change much. Therefore, in calculation, the latencies in this part are regarded to be equal, that is:

$\Delta tAB[i] \approx \Delta tAB[j] \approx \Delta tBA[i] \approx \Delta tBA[j]$, which is referred to as $\Delta tAB$, and calculated as follows:

$$\Delta tAB = [(t1B[i] - t2A[i]) + (t1'\ A[j] - t2'B[j])]/2.$$

A time base offset of transmission node B relative to transmission node A is:

$$\text{Offset AB} = [(t1B[i] - t2A[i]) - (t1'\ A[j] - t2'\ B[j])/2.$$

That is, OffsetAB is added to a current time of transmission node B to acquire a same time base as transmission node A.

When transmission nodes on a same transmission path have a same time base, time stamps acquired from latency analysis in the transmission nodes have a unified reference.

Time synchronization among transmission nodes has been described above.

The method according to the embodiments of the present application has been described above from the perspective of the SDN controller. The method according to the embodiments of the present application will be described below from the perspective of a head node on a transmission path.

Figure 13:
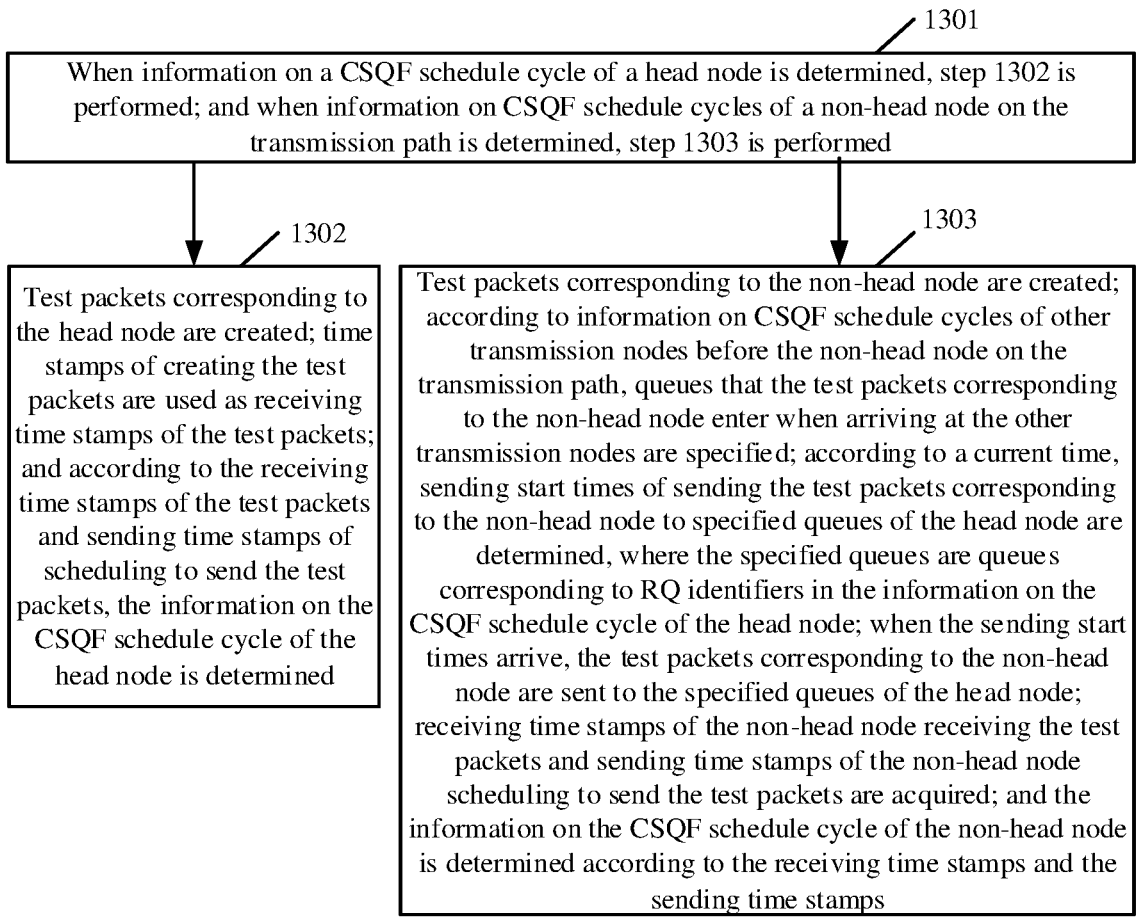
FIG. 13 is a flowchart illustrating another method according to an embodiment of the present application.

FIG. 13 is a flowchart illustrating another method according to an embodiment of the present application. The method is applied to a head node on a transmission path in a DetNet. As shown in FIG. 13, the method may include the following steps:

At step 1301, when information on a CSQF schedule cycle of a head node is determined, step 1302 is performed; and when information on CSQF schedule cycles of a non-head node on the transmission path is determined, step 1303 is performed.

At step 1302, test packets corresponding to the head node are created; time stamps of creating the test packets are used as receiving time stamps of the test packets; and according to the receiving time stamps of the test packets and sending time stamps of scheduling to send the test packets, the information on the CSQF schedule cycle of the head node is determined.

In step 1302, for determining the information on the CSQF schedule cycle of the head node, reference may be made to the processes shown in FIG. 5, which will not be repeated here.

At step 1303, test packets corresponding to the non-head node are created; according to information on CSQF schedule cycles of other transmission nodes before the non-head node on the transmission path, queues that the test packets corresponding to the non-head node enter when arriving at the other transmission nodes are specified; according to a current time, sending start times of sending the test packets corresponding to the non-head node to specified queues of the head node are determined, where the specified queues are queues corresponding to RQ identifiers in the information on the CSQF schedule cycle of the head node; when the sending start times arrive, the test packets corresponding to the non-head node are sent to the specified queues of the head node; receiving time stamps of the non-head node receiving the test packets and sending time stamps of the non-head node scheduling to send the test packets are acquired; and the information on the CSQF schedule cycle of the non-head node is determined according to the receiving time stamps and the sending time stamps.

In this embodiment, the specified queues that the test packets enter when arriving at the other transmission nodes are queues corresponding to RQ identifiers in the information on the CSQF schedule cycles of the other transmission nodes.

In addition, in this embodiment, determining, according to the current time, the sending start times of sending the test packets corresponding to the non-head node to the specified queues of the head node is similar to step 602, except that here the T-starts need to be modified into the following initial sending times: initial sending times of the test packets configured to enter the specified queues of the head node. Other aspects are similar, and will not be repeated here.

In this embodiment, when the sending start times arrive, the test packets corresponding to the non-head node are sent to the specified queues of the head node; then the head node, based on a CSQF schedule cycle, will schedule to send the test packets in the specified queues when the CSQF schedule cycles for scheduling the specified queues arrive. According to description in the embodiment shown in FIG. 6, a next hop of the head node, such as transmission node B, will store received test packets in queues corresponding to RQ identifiers in information on a CSQF schedule cycle of the transmission node as configured. Afterwards, when CSQF schedule cycles of the queues arrive, test packets in the queues will be scheduled to be sent. By that analogy, finally, the test packets corresponding to the non-head node will be sent to the non-head node. The non-head node, when receiving the test packets, will record their receiving time stamps. At the same time, the non-head node will store the test packets in corresponding queues, and different test packets are stored in different queues. Afterwards, the non-head node will schedule to send the test packets in the queues according to a CSQF schedule cycle, and record sending time stamps of the test packets. Afterwards, the head node, after acquiring the receiving time stamps of the non-head node receiving test packets and the sending time stamps of the non-head node scheduling to send test packets, determines the information on the CSQF schedule cycle of the non-head node according to the receiving time stamps and the sending time stamps. For details, reference may be made to the processes shown in FIG. 5, which will not be repeated here.

So far, the processes shown in FIG. 13 are completed.

Through the processes shown in FIG. 13, the head node on the transmission path determines the information on the CSQF schedule cycle of each transmission node on an entire transmission path.

Figure 14:
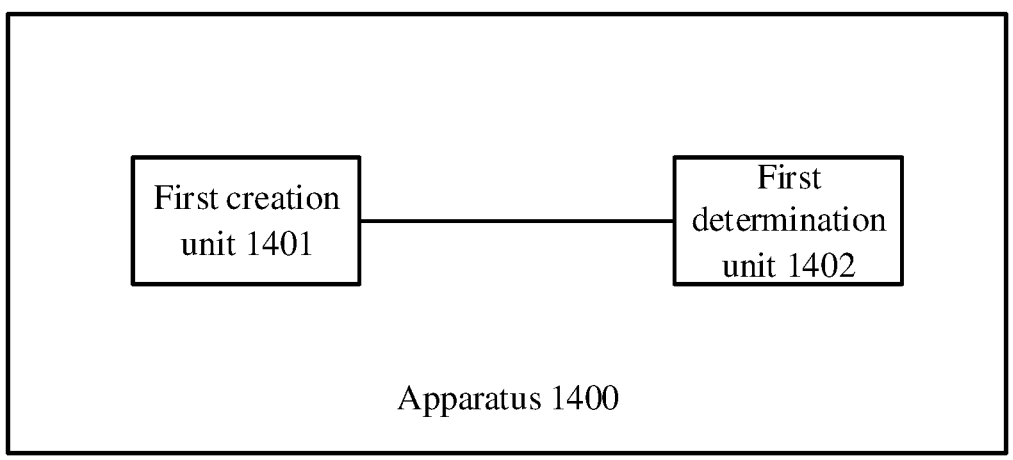
FIG. 14 is a structural diagram illustrating an apparatus according to an embodiment of the present application.

The method according to the embodiments of the present application has been described above. An apparatus according to the embodiments of the present application will be described below:

FIG. 14 is a structural diagram illustrating an apparatus 1400 according to an embodiment of the present application. The apparatus is performed by an SDN controller, and includes:

a first creation unit 1401, configured to, for each transmission node on a transmission path in a DetNet, create test packets corresponding to the transmission node;

a first determination unit 1402, configured to, when the transmission node is a head node on the transmission path, send the test packets corresponding to the transmission node to the transmission node, acquire receiving time stamps of the transmission node receiving the test packets and sending time stamps of the transmission node scheduling to send the test packets, and determine, according to the receiving time stamps and the sending time stamps, information on a CSQF schedule cycle of the transmission node; or when the transmission node is not a head node on the transmission path, control, according to information on CSQF schedule cycles of other transmission nodes before the transmission node on the transmission path, the test packets corresponding to the transmission node, when arriving at the other transmission nodes before the transmission node on the transmission path, to enter receiving queues RQs of the other transmission nodes, acquire receiving time stamps of the transmission node receiving the test packets and sending time stamps of the transmission node scheduling to send the test packets, and determine, according to the receiving time stamps and the sending time stamps, information on a CSQF schedule cycle of the transmission node.

In some examples, a total number N of the test packets corresponding to the transmission node is a total number of queues that the transmission node has and are implemented by CSQF.

In some examples, N test packets corresponding to the transmission node are configured to enter N queues of the transmission node, respectively.

In some examples, determining, according to the receiving time stamps and the sending time stamps, the information on the CSQF schedule cycle of the transmission node includes.

determining a first target test packet according to sending time stamps of all test packets, where a sending time stamp of the first target test packet is later than sending time stamps of other test packets, or a time difference between a sending time stamp and a receiving time stamp of the first target test packet is larger than a time difference between sending time stamp and receiving time stamp of any one of the other test packets;

determining, according to the sending time stamp of the first target test packet and a principle that a sending time stamp of a latest sent test packet is approximately a start time of the CSQF schedule cycle, the information on the CSQF schedule cycle of the transmission node.

In some examples, determining, according to the sending time stamp of the first target test packet and the principle that the sending time stamp of the latest sent test packet is approximately the start time of the CSQF schedule cycle, the information on the CSQF schedule cycle of the transmission node includes:

determining a second target test packet according to receiving time stamps of all the test packets, where a receiving time stamp of the second target test packet is earlier than receiving time stamps of other test packets;

determining a loop variable value Loop satisfying the following formula: t2A[p]>t1A[q]+Loop*T, where t2A[p] represents the sending time stamp of the first target test packet, t1A[q] represents the receiving time stamp of the second target test packet, and T is a duration of a CSQF schedule cycle;

determining the information on the CSQF schedule cycle according to the sending time stamp of the first target test packet, the receiving time stamp of the second target test packet, and the Loop.

In some examples, the information on the CSQF schedule cycle includes at least: a cycle start time, a sending queue SQ identifier, and an RQ identifier, where the cycle start time refers to a start time of a target CSQF schedule cycle where the transmission node is located when the second target test packet is received, and the cycle start time is expressed by t2A[p]–Loop*T;

the SQ identifier is for indicating a queue identifier of a queue being scheduled to be sent in the target CSQF schedule cycle, and the SQ identifier is expressed by (p−1+N −Loop) mod N+1, where p refers to a sequence number of the second target test packet;

the RQ identifier is for indicating a queue identifier of a queue being scheduled to be sent in a next CSQF schedule cycle of the target CSQF schedule cycle, and the RQ identifier is expressed by (p+N−Loop) mod N+1.

In some examples, controlling, according to the information on the CSQF schedule cycles of the other transmission nodes before the transmission node on the transmission path, the test packets corresponding to the transmission node, when arriving at the other transmission nodes before the transmission node on the transmission path, to enter the receiving queues RQs of the other transmission nodes includes:

specifying, according to the information on the CSQF schedule cycles of the other transmission nodes before the transmission node on the transmission path, queues that the test packets corresponding to the transmission node enter when arriving at the other transmission nodes, where the specified queues are queues corresponding to RQ identifiers in the information on the CSQF schedule cycles of the other transmission nodes;

determining, according to a current time, sending start times of sending the test packets corresponding to the transmission node to the head node on the transmission path, where the sending start times are for controlling the test packets corresponding to the transmission node to enter specified queues of the head node, and the specified queues are queues corresponding to RQ identifiers in information on a CSQF schedule cycle of the head node;

when the sending start times arrive, sending the test packets corresponding to the transmission node to the head node on the transmission path.

Optionally, in this embodiment, the determination unit further performs time adjustment on at least one transmission node on the transmission path, so as to control time synchronization among all transmission nodes on the transmission path.

So far, structural description of the apparatus shown in FIG. 14 is completed.

Figure 15:
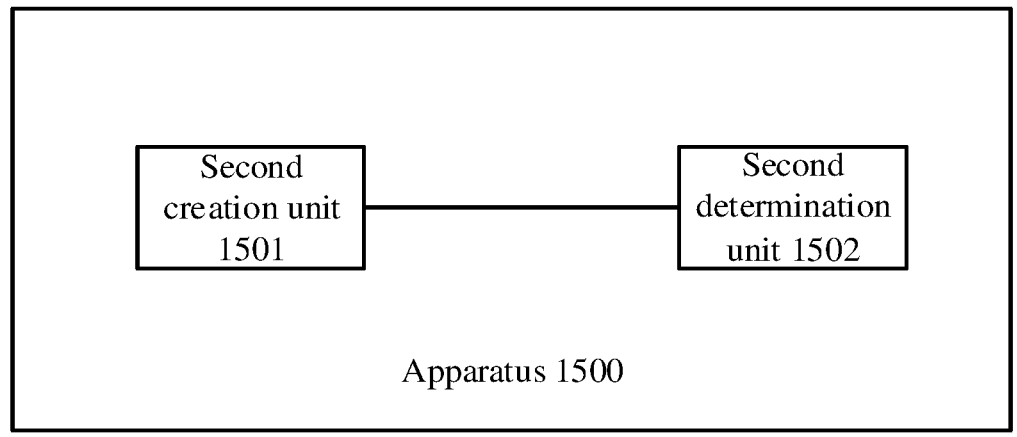
FIG. 15 is a structural diagram illustrating another apparatus according to an embodiment of the present application.

FIG. 15 is a structural diagram illustrating another apparatus 1500 according to an embodiment of the present application. The apparatus is performed by a head node on a transmission path in a DetNet, and can include:

a second creation unit 1501, configured to, when determining information on a CSQF schedule cycle of the head node, create test packets corresponding to the head node, and when determining information on CSQF schedule cycles of non-head nodes on the transmission path, create test packets corresponding to the non-head nodes;

a second determination unit 1502, configured to, when determining the information on the CSQF schedule cycle of the head node, use time stamps of creating the test packets as receiving time stamps of the test packets, and determine, according to the receiving time stamps of the test packets and sending time stamps of scheduling to send the test packets, the information on the CSQF schedule cycle of the head node; or when determining the information on a CSQF schedule cycle of a non-head node on the transmission path, specify, according to information on CSQF schedule cycles of other transmission nodes before the non-head node on the transmission path, queues that the test packets corresponding to the non-head node enter when arriving at the other transmission nodes, where the specified queues are queues corresponding to RQ identifiers in the information on the CSQF schedule cycles of the other transmission nodes, determine, according to a current time, sending start times of sending the test packets corresponding to the non-head node to specified queues of the head node, where the sending start times are for controlling test packets corresponding to a transmission node to enter the specified queues of the head node, and the specified queues are queues corresponding to RQ identifiers in the information on the CSQF schedule cycle of the head node, when the sending start times arrive, send the test packets corresponding to the non-head node to the specified queues of the head node, acquire receiving time stamps of the non-head node receiving the test packets and sending time stamps of the non-head node scheduling to send the test packets, and determine, according to the receiving time stamps and the sending time stamps, the information on the CSQF schedule cycle of the non-head node.

So far, structural description of the apparatus shown in FIG. 15 is completed.

Figure 16:
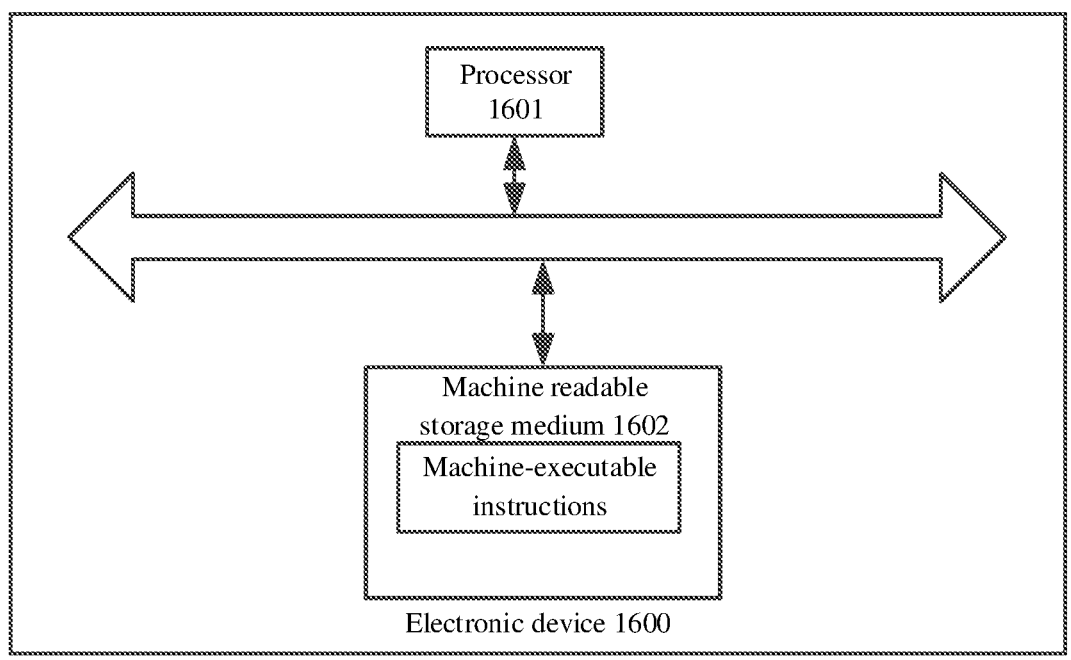
FIG. 16 is a structural diagram illustrating an electronic device according to an embodiment of the present application.

An embodiment of the present application provides a hardware structure of the apparatus shown in FIG. 14 or 15. FIG. 16 is a structural diagram illustrating an electronic device 1600 according to an embodiment of the present application. As shown in FIG. 16, the hardware structure can include: a processor 1601 and a machine readable storage medium 1602, where the machine readable storage medium stores machine-executable instructions executable by the processor; the processor is configured to execute the machine executable instructions to implement the methods disclosed in the above embodiments of the present application.

Based on a same application concept as the above methods, an embodiment of the present application provides a machine readable storage medium having several computer instructions stored thereon, where, when the computer instructions are executed by a processor, the methods disclosed in the above embodiments of the present application can be implemented.

For example, the machine readable storage medium may be any electronic, magnetic, optical, or other physical storage apparatus, and may contain or store information, such as executable instructions, and data. For example, the machine readable storage medium may be: a Radom Access Memory (RAM for short), a volatile memory, a non-volatile memory, a flash memory, a storage drive (such as hard drive), a solid state hard disk, any type of storage disk (such as optical discs, and Digital Video Disks (DVDs for short)), or similar storage medium, or a combination of them.

The system, apparatus, module or unit set forth in the above examples may be specifically implemented by a computer chip or an entity, or implemented by a product having a certain function. A typical implementation device is a computer, and a specific form of the computer may be a personal computer, a laptop computer, a cellular phone, a camera phone, a smart phone, a personal digital assistant, a media player, a navigation device, an e-mail transceiver device, a game console, a tablet computer, a wearable device, or a combination of any of these devices.

For the convenience of description, during the description of the apparatus, it is divided into various units according to their functions, which are described respectively. Of course, when the present application is implemented, functions of each unit may be realized in one or more software and/or hardware.

Those skilled in the art should understand that the embodiments of the present application may be provided as methods, systems, or computer program products. Accordingly, the present application may take the form of a pure hardware embodiment, a pure software embodiment, or an embodiment combining software and hardware aspects. Furthermore, the embodiments of the present application may take the form of a computer program product implemented on one or more computer usable storage media (including, but not limited to, disk storage, Compact Disc Read-Only Memory (CD-ROM for short), optical storage, etc.) having computer usable program codes therein.

The present application is described with reference to flowcharts and/or block diagrams illustrating methods, apparatuses (or systems), and computer program products according to the embodiments of the present application. It should be understood that each process and/or block, and combinations of processes and/or blocks in the flowcharts and/or block diagrams can be implemented by computer program instructions. These computer program instructions may be provided to a processor of a general-purpose computer, a special-purpose computer, an embedded processing machine or other programmable data processing device to produce a machine, so that the instructions executed by the processor of the computer or other programmable data processing device produce an apparatus for realizing functions specified in one or more processes in a flowchart and/or one or more blocks in a block diagram.

Furthermore, these computer program instructions may be stored in a computer readable memory capable of directing a computer or other programmable data processing device to operate in a particular manner, so that the instructions stored in the computer readable memory produce a product including an instruction device. The instruction device can realize functions specified in one or more processes in a flowchart and/or one or more blocks in a block diagram.

These computer program instructions may be loaded on a computer or other programmable data processing device, so that a series of operation steps are performed on the computer or other programmable device to produce processes implemented by a computer, and the instructions executed on the computer or other programmable device provide steps for realizing functions specified in one or more processes in a flowchart and/or one or more blocks in a block diagram.

The above are only embodiments of the present application, which are not intended to limit the present application. For those skilled in the art, various modifications and variations can be made to the application. Any modification, equivalent replacement, improvement, etc. made within the spirit and principle of the present application shall fall into the scope of the claims of the present application.

The invention claimed is:

1. A method for collecting Cycle Specified Queuing and Forwarding (CSQF) schedule cycles applied to a deterministic network, wherein the method is performed by a Software-Defined Networking (SDN) controller, and comprises:
   for each transmission node on a transmission path in the deterministic network,
      if the transmission node is a head node on the transmission path,
         creating and sending test packets corresponding to the transmission node to the transmission node,
         acquiring receiving time stamps of the transmission node receiving the test packets and sending time stamps of the transmission node scheduling to send the test packets, and
         determining, according to the receiving time stamps and the sending time stamps, information on a CSQF schedule cycle of the transmission node;
      if the transmission node is not a head node on the transmission path,
         creating test packets corresponding to the transmission node,
         controlling, according to information on CSQF schedule cycles of other transmission nodes before the transmission node on the transmission path, the test packets corresponding to the transmission node, when arriving at the other transmission nodes before the transmission node on the transmission path, to enter receiving queues (RQs) of the other transmission nodes,
         acquiring receiving time stamps of the transmission node receiving the test packets and sending time stamps of the transmission node scheduling to send the test packets, and
         determining, according to the receiving time stamps and the sending time stamps, information on a CSQF schedule cycle of the transmission node.

2. The method according to claim 1, wherein a total number N of the test packets corresponding to the transmission node is a total number of queues that the transmission node has and are implemented by CSQF.

3. The method according to claim 2, wherein N test packets corresponding to the transmission node are configured to enter N queues of the transmission node, respectively.

4. The method according to claim 1, wherein determining, according to the receiving time stamps and the sending time stamps, the information on the CSQF schedule cycle of the transmission node comprises:
   determining a first target test packet according to sending time stamps of all test packets, wherein a sending time stamp of the first target test packet is later than sending time stamps of other test packets, or a time difference between a sending time stamp and a receiving time stamp of the first target test packet is larger than a time difference between the sending time stamp and receiving time stamp of any one of the other test packets; and determining, according to the sending time stamp of the first target test packet and a principle that a sending time stamp of a latest sent test packet is approximately a start time of the CSQF schedule cycle, the information on the CSQF schedule cycle of the transmission node.

5. The method according to claim 4, wherein determining, according to the sending time stamp of the first target test packet and the principle that the sending time stamp of the latest sent test packet is approximately the start time of the CSQF schedule cycle, the information on the CSQF schedule cycle of the transmission node comprises:

determining a second target test packet according to receiving time stamps of all the test packets, wherein a receiving time stamp of the second target test packet is earlier than receiving time stamps of other test packets;

determining a loop variable value Loop satisfying following formula: t2A[p]>t1A[q]+Loop*T, wherein t2A[p] represents the sending time stamp of the first target test packet, t1A[q] represents the receiving time stamp of the second target test packet, and T is a duration of a CSQF schedule cycle; and determining the information on the CSQF schedule cycle according to the sending time stamp of the first target test packet, the receiving time stamp of the second target test packet, and the Loop.

6. The method according to claim 5, wherein the information on the CSQF schedule cycle comprises at least: a cycle start time, a sending queue (SQ) identifier, and an RQ identifier, wherein the cycle start time refers to a start time of a target CSQF schedule cycle where the transmission node is located when the second target test packet is received, and the cycle start time is expressed by t2A[p]−Loop*T;

the SQ identifier is for indicating a queue identifier of a queue being scheduled to be sent in the target CSQF schedule cycle, and the SQ identifier is expressed by (p−1+N−Loop) mod N+1, wherein p refers to a sequence number of the second target test packet; and the RQ identifier is for indicating a queue identifier of a queue being scheduled to be sent in a next CSQF schedule cycle of the target CSQF schedule cycle, and the RQ identifier is expressed by (p+N−Loop) mod N+1.

7. The method according to claim 1, wherein controlling, according to the information on the CSQF schedule cycles of the other transmission nodes before the transmission node on the transmission path, the test packets corresponding to the transmission node, when arriving at the other transmission nodes before the transmission node on the transmission path, to enter the receiving queues (RQs) of the other transmission nodes comprises:

specifying, according to the information on the CSQF schedule cycles of the other transmission nodes before the transmission node on the transmission path, queues that the test packets corresponding to the transmission node enter when arriving at the other transmission nodes, wherein the specified queues are queues corresponding to RQ identifiers in the information on the CSQF schedule cycles of the other transmission nodes;

determining, according to a current time, sending start times of sending the test packets corresponding to the transmission node to the head node on the transmission path, wherein the sending start times are for controlling the test packets corresponding to the transmission node to enter specified queues of the head node, and the specified queues are queues corresponding to RQ identifiers in information on a CSQF schedule cycle of the head node; and when the sending start times arrive, sending the test packets corresponding to the transmission node to the head node on the transmission path.

8. The method according to claim 1, wherein before the method is performed, time adjustment is performed on at least one transmission node on the transmission path, so as to control time synchronization among all transmission nodes on the transmission path.

9. A non-transitory computer-readable storage medium, storing a computer program, wherein the program is executed by a processor to perform the steps in the method according to claim 1.

10. A method for collecting Cycle Specified Queuing and Forwarding (CSQF) schedule cycles applied to a deterministic network, wherein the method is performed by a head node on a transmission path in the deterministic network, and comprises:

when determining information on a CSQF schedule cycle of the head node, creating test packets corresponding to the head node, using time stamps of creating the test packets as receiving time stamps of the test packets, and determining, according to the receiving time stamps of the test packets and sending time stamps of scheduling to send the test packets, the information on the CSQF schedule cycle of the head node; and when determining information on a CSQF schedule cycle of a non-head node on the transmission path, creating test packets corresponding to the non-head node, specifying, according to information on CSQF schedule cycles of other transmission nodes before the non-head node on the transmission path, queues that the test packets corresponding to the non-head node enter when arriving at the other transmission nodes, wherein the specified queues are queues corresponding to Receiving Queue (RQ) identifiers in the information on the CSQF schedule cycles of the other transmission nodes, determining, according to a current time, sending start times of sending the test packets corresponding to the non-head node to specified queues of the head node, wherein the sending start times are for controlling test packets corresponding to a transmission node to enter the specified queues of the head node, and the specified queues are queues corresponding to RQ identifiers in the information on the CSQF schedule cycle of the head node, when the sending start times arrive, sending the test packets corresponding to the non-head node to the specified queues of the head node, acquiring receiving time stamps of the non-head node receiving the test packets and sending time stamps of the non-head node scheduling to send the test packets, and determining, according to the receiving time stamps and the sending time stamps, the information on the CSQF schedule cycle of the non-head node.

11. A non-transitory computer-readable storage medium, storing a computer program, wherein the program is executed by a processor to perform the steps in the method according to claim 9.

12. An electronic device, comprising: a processor and a machine-readable storage medium, wherein
the machine readable storage medium stores machine-executable instructions executable by the processor; and
the processor is configured to execute the machine executable instructions to perform operations comprising:
for each transmission node on a transmission path in a deterministic network,
if the transmission node is a head node on the transmission path,
creating and sending test packets corresponding to the transmission node to the transmission node,
acquiring receiving time stamps of the transmission node receiving the test packets and sending time stamps of the transmission node scheduling to send the test packets, and
determining, according to the receiving time stamps and the sending time stamps, information on a Cycle Specified Queuing and Forwarding (CSQF) schedule cycle of the transmission node;
if the transmission node is not a head node on the transmission path,
creating test packets corresponding to the transmission node,
controlling, according to information on CSQF schedule cycles of other transmission nodes before the transmission node on the transmission path, the test packets corresponding to the transmission node, when arriving at the other transmission nodes before the transmission node on the transmission path, to enter receiving queues (RQs) of the other transmission nodes,
acquiring receiving time stamps of the transmission node receiving the test packets and sending time stamps of the transmission node scheduling to send the test packets, and
determining, according to the receiving time stamps and the sending time stamps, information on a CSQF schedule cycle of the transmission node.

13. The electronic device according to claim 12, wherein a total number N of the test packets corresponding to the transmission node is a total number of queues that the transmission node has and are implemented by CSQF.

14. The electronic device according to claim 13, wherein N test packets corresponding to the transmission node are configured to enter N queues of the transmission node, respectively.

15. The electronic device according to claim 12, wherein determining, according to the receiving time stamps and the sending time stamps, the information on the CSQF schedule cycle of the transmission node comprises:
determining a first target test packet according to sending time stamps of all test packets, wherein a sending time stamp of the first target test packet is later than sending time stamps of other test packets, or a time difference between a sending time stamp and a receiving time stamp of the first target test packet is larger than a time difference between the sending time stamp and receiving time stamp of any one of the other test packets; and
determining, according to the sending time stamp of the first target test packet and a principle that a sending time stamp of a latest sent test packet is approximately a start time of the CSQF schedule cycle, the information on the CSQF schedule cycle of the transmission node.

16. The electronic device according to claim 15, wherein determining, according to the sending time stamp of the first target test packet and the principle that the sending time stamp of the latest sent test packet is approximately the start time of the CSQF schedule cycle, the information on the CSQF schedule cycle of the transmission node comprises:
determining a second target test packet according to receiving time stamps of all the test packets, wherein a receiving time stamp of the second target test packet is earlier than receiving time stamps of other test packets;
determining a loop variable value Loop satisfying following formula: $t2A[p]>t1A[q]+Loop*T$, wherein $t2A[p]$ represents the sending time stamp of the first target test packet, $t1A[q]$ represents the receiving time stamp of the second target test packet, and T is a duration of a CSQF schedule cycle; and
determining the information on the CSQF schedule cycle according to the sending time stamp of the first target test packet, the receiving time stamp of the second target test packet, and the Loop.

17. The electronic device according to claim 16, wherein the information on the CSQF schedule cycle comprises at least: a cycle start time, a sending queue (SQ) identifier, and an RQ identifier, wherein
the cycle start time refers to a start time of a target CSQF schedule cycle where the transmission node is located when the second target test packet is received, and the cycle start time is expressed by $t2A[p]-Loop*T$;
the SQ identifier is for indicating a queue identifier of a queue being scheduled to be sent in the target CSQF schedule cycle, and the SQ identifier is expressed by $(p-1+N-Loop) \bmod N+1$, wherein p refers to a sequence number of the second target test packet; and
the RQ identifier is for indicating a queue identifier of a queue being scheduled to be sent in a next CSQF schedule cycle of the target CSQF schedule cycle, and the RQ identifier is expressed by $(p+N-Loop) \bmod N+1$.

18. The electronic device according to claim 12, wherein controlling, according to the information on the CSQF schedule cycles of the other transmission nodes before the transmission node on the transmission path, the test packets corresponding to the transmission node, when arriving at the other transmission nodes before the transmission node on the transmission path, to enter the receiving queues (RQs) of the other transmission nodes comprises:
specifying, according to the information on the CSQF schedule cycles of the other transmission nodes before the transmission node on the transmission path, queues that the test packets corresponding to the transmission node enter when arriving at the other transmission nodes, wherein the specified queues are queues corresponding to RQ identifiers in the information on the CSQF schedule cycles of the other transmission nodes;
determining, according to a current time, sending start times of sending the test packets corresponding to the transmission node to the head node on the transmission path, wherein the sending start times are for controlling the test packets corresponding to the transmission node to enter specified queues of the head node, and the specified queues are queues corresponding to RQ identifiers in information on a CSQF schedule cycle of the head node; and
when the sending start times arrive, sending the test packets corresponding to the transmission node to the head node on the transmission path.

19. The electronic device according to claim 12, wherein before the method is performed, time adjustment is performed on at least one transmission node on the transmission path, so as to control time synchronization among all transmission nodes on the transmission path.

\* \* \* \* \*